US011885296B2

(12) United States Patent
Jensen

(10) Patent No.: US 11,885,296 B2
(45) Date of Patent: Jan. 30, 2024

(54) REMOVABLE FUNCTIONAL MODULE FOR A WIND TURBINE AND METHOD OF COUPLING A FUNCTIONAL MODULE TO A WIND TURBINE

(71) Applicant: Siemens Gamesa Renewable Energy A/S, Brande (DK)

(72) Inventor: Jens Bomholt Jensen, Horsens (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/186,983

(22) Filed: Feb. 26, 2021

(65) Prior Publication Data

US 2021/0277871 A1    Sep. 9, 2021

(30) Foreign Application Priority Data

Mar. 6, 2020  (EP) ..................................... 20161450

(51) Int. Cl.
   *F03D 80/60*     (2016.01)
   *F03D 80/80*     (2016.01)
   *F03D 13/10*     (2016.01)

(52) U.S. Cl.
   CPC ............. *F03D 13/10* (2016.05); *F03D 80/60* (2016.05); *F03D 80/881* (2023.08); *F05B 2230/61* (2013.01); *F05B 2240/14* (2013.01)

(58) Field of Classification Search
   CPC ........... F03D 80/60; F03D 13/10; F03D 13/20
   See application file for complete search history.

(56) References Cited

U.S. PATENT DOCUMENTS

| 8,011,893 | B2 * | 9/2011 | Stiesdal | .................. F03D 13/10 |
| | | | | 416/204 R |
| 8,692,403 | B2 * | 4/2014 | Holstein | .............. H02K 7/1823 |
| | | | | 290/54 |
| 8,890,348 | B2 * | 11/2014 | Munk-Hansen | ........ F03D 13/40 |
| | | | | 290/55 |

(Continued)

FOREIGN PATENT DOCUMENTS

| DE | 102007062622 A1 | 6/2009 |
| EP | 2520792 B2 | 4/2018 |
| WO | 2018196933 A1 | 11/2018 |

OTHER PUBLICATIONS

Extended European Search Report in corresponding European Patent Application No. 20161450.0 dated Sep. 21, 2020. 7 pages.

*Primary Examiner* — Justin D Seabe
(74) *Attorney, Agent, or Firm* — Schmeiser, Olsen & Watts LLP

(57) ABSTRACT

A removable, functional module for a wind turbine is provided. The functional module includes a fastening element configured to detachably fasten the functional module to the wind turbine in a predetermined position, wherein the functional module is removable from the predetermined position, when the fastening element is unfastened. The functional module further includes a cover configured to form part of a housing of the wind turbine, when the functional module is in the predetermined position. The functional module is configured to carry out a function contributing to the operation of the wind turbine, when the functional module is in the predetermined position. Furthermore, a corresponding method for coupling a functional module to a wind turbine is also provided.

15 Claims, 4 Drawing Sheets

(56) References Cited

U.S. PATENT DOCUMENTS

| | | | | |
|---|---|---|---|---|
| 8,922,038 | B2* | 12/2014 | Bywaters | F03D 13/20 |
| | | | | 290/44 |
| 10,352,306 | B2* | 7/2019 | Baun | F03D 15/00 |
| 10,781,798 | B2* | 9/2020 | Trede | F03D 13/20 |
| 2009/0129931 | A1 | 5/2009 | Stiesdal | |
| 2012/0146335 | A1 | 6/2012 | Bywaters et al. | |
| 2013/0011272 | A1* | 1/2013 | Mortensen | F03D 80/82 |
| | | | | 416/244 R |
| 2015/0001847 | A1* | 1/2015 | Oba | F03D 80/60 |
| | | | | 290/44 |
| 2019/0277263 | A1 | 9/2019 | Airoldi et al. | |
| 2019/0323486 | A1* | 10/2019 | Siegfriedsen | F03D 9/25 |
| 2020/0072184 | A1* | 3/2020 | Taubenrauch | F03D 1/00 |

\* cited by examiner

REMOVABLE FUNCTIONAL MODULE FOR A WIND TURBINE AND METHOD OF COUPLING A FUNCTIONAL MODULE TO A WIND TURBINE

CROSS-REFERENCE TO RELATED APPLICATIONS

This application claims priority to European Patent Application No. 20161450.0, having a filing date of Mar. 6, 2020, the entire contents of which are hereby incorporated by reference.

FIELD OF THE TECHNOLOGY

The following relates to the field of wind turbines. Specifically, the embodiments of the present invention relates to a functional module for a wind turbine which is easily removable from the wind turbine. It further relates to a method of coupling a functional module to a wind turbine.

BACKGROUND

Modern wind turbines comprise various functional systems required for their operation. Any of these functional systems may need maintenance or repair work, which is often complex, time-consuming and costly. Further difficulties could result, if the wind turbines are installed at locations which are not easily accessible such as offshore wind parks.

Cooling systems as one example of such functional systems are conventionally implemented in wind turbines in a complicated way, with parts arranged in different parts of the nacelle and on top of the nacelle. The cooling systems are already assembled during the assembly of the nacelle, which renders it difficult to pre-arrange and test such systems prior to the final installation in the nacelle of the wind turbine.

Thus, there may be a need to integrate functional systems such as cooling systems into a wind turbine in a particularly simple and efficient manner, which may for example enable easy access to the functional system for maintenance and repair work.

SUMMARY

This need may be met by the subject matter according to the independent claims. Advantageous embodiments of the present invention are described by the dependent claims.

According to a first aspect of the present invention, a functional module for a wind turbine comprises a fastening element, which is configured to detachably fasten the functional module to the wind turbine in a predetermined position, in particular a predetermined position of the functional module relative to the wind turbine. The functional module is removable from the predetermined position, when the fastening element is unfastened. The functional module further comprises a cover configured to form part of a housing of the wind turbine, when the functional module is in the predetermined position. The functional module is configured to carry out a function contributing to the operation of the wind turbine, when the functional module is in the predetermined position.

According to a further aspect of the present invention, a method of coupling a functional module to a wind turbine comprises detachably fastening the functional module to the wind turbine in a predetermined position by means of a fastening element, wherein the functional module is removable from the predetermined position, when the fastening element is unfastened. The wind turbine comprises a cover configured to form part of a housing of the wind turbine, when the functional module is in the predetermined position. The functional module is configured to carry out a function contributing to the operation of the wind turbine, when the functional module is in the predetermined position.

In the context of the present application, the term "functional module" may denote any component of a system or device that helps to carry out a function which supports or contributes to the operation of the system or device, e.g. of a wind turbine. It may help to carry out several different functions. A module may be an easily exchangeable and/or easily removable component of the system or device. A module may be designed in a particularly compact way with different parts of the module being closely packed. It may be built as a single piece, which may be easily separable from other parts of the system or device. It may be built in a monolithic manner.

A module may have interfaces for interacting with other parts of the system or device and/or the environment of the system or device, for example interfaces for exchanging matter, energy and/or information. The module may also have fastening elements for attaching the module to other parts of the system or device and/or the environment. The interfaces and/or fastening elements may be standardized. Modules may be designed, built, tested, modified, exchanged, maintained, serviced and/or repaired independently of other parts of the system or device, of which the module forms part.

A "function" realized or implemented by a functional module may for example pertain to the conversion of kinetic energy into electrical energy, to the conversion of air flow into motion of parts of the wind turbine, to the transformation of one type of motion into another type of motion, e.g. rotational motions with different angular velocities, to the control of specific parameters of the wind turbine such as a yawing angle or pitch angles of the rotor blades and/or to wind turbine monitoring and diagnostics. The function may be a primary function required for the operation of the wind turbine, rather than a secondary or auxiliary function such as protection or mechanical stabilization and support.

The function may pertain to a ventilation of an inner region of the wind turbine, in particular of the nacelle, and/or a cooling of one or more components of the wind turbine. As a result of the cooling and/or ventilation, one or more temperature values of the components may be controllable such that they do not surpass respective threshold temperatures. A threshold temperature may be defined as a temperature, above which reliable operation of the component may not be guaranteed and/or above which the component may be subject to excessive wear potentially having a negative impact on the durability and reliability of the component.

The functional module may comprise a functional component, which serves to carry out the function. It may comprise one or more additional components such as a cover or a carrier structure, which may serve secondary or auxiliary functions, e.g. protection against external influences or mechanical stabilization of the functional module. The functional module, in particular the functional component, may comprise or be a cooling device, a generator, a gearbox, a ventilation device, a yaw drive, a pitch drive, and/or a rotor.

In the present context, a "wind turbine" is any device that is configured to convert wind energy into electrical energy, in particular for distribution to a grid and/or for local energy supply. A wind turbine may comprise a nacelle, a tower, a rotor, a shaft, in particular a low-speed shaft and/or a high-speed shaft, a generator, a gearbox, a brake assembly, a pitch drive, and/or a yaw drive. The wind turbine may be a direct-drive wind turbine which does not require a gear box. The "operation" of the wind turbine may refer to a state or succession of states assumed by the wind turbine in which the wind turbine converts kinetic energy of impacting wind into electric energy.

The functional module may be arrangeable in a "predetermined position". The predetermined position may be defined relative to the wind turbine, in particular relative to the nacelle of the wind turbine. The predetermined position may be in an upper part of the wind turbine. It may be on top of the tower of the wind turbine. The predetermined position may be defined as a position, in which the functional module is able to carry out its intended function. The predetermined position may be defined as a position, in which the functional module is attachable to the wind turbine, in particular by using one or more fastening elements of the functional module. The predetermined position may be within a housing, in particular within a nacelle, or adjacent to the housing, in particular adjacent to the nacelle.

A "housing" may be a structure that covers and/or supports objects and/or installations of a wind turbine, in particular for protection and/or mechanical stabilization. It may at least partially surround, in particular completely surround, the objects and/or installations. The housing may be or comprise a casing, an enclosure, and/or a canopy. An outer surface of the housing may be exposed to an environment of the wind turbine. The housing may comprise a plurality of panels which are attached to each other. The housing may comprise an opening, through which an inner region protected by the housing may be accessible. The opening may be closeable or blockable, e.g. with a removable cover such as a door, a hatch or a lid. The housing may comprise a frame providing mechanical stability for the housing, to which frame the panels may be attached.

The housing may be a nacelle. A "nacelle" may be a housing of a wind turbine, within which various components of the wind turbine are located. It may be arranged on top of the tower of a wind turbine. It may be arranged opposite from a rotor of a wind turbine. The nacelle may contain a generator, a gearbox, a drive train, a shaft, in particular a low- and/or high-speed shaft, a brake assembly and/or a controller. It may contain a blade pitch control, configured to control the angle of the blades, and/or a yaw drive, configured to control the position of the turbine relative to the wind.

A "cover" may be any physical structure that protects one or more objects. It may be a structure that can be placed over or about an object. A cover may partially or fully surround the object that it covers. The cover may form part of the functional module, which it may be configured to protect or cover. The cover may be attached to the functional module, in particular permanently fixed to the functional module. It may be integrally formed with the functional module. The cover may be configured to cover a hole or opening in the housing, through which the functional module may enter the interior of the housing and/or may be removable from the housing. The cover may be configured to form an outer surface exposed to an environment of the wind turbine. The cover may comprise a frame providing mechanical stability. A skin or screen, comprised by the cover, may be attached to the frame. The cover may comprise one or more panels which are attached to each other.

A "fastening element" may be a device or part of a device that mechanically joins or affixes two or more objects together. Fastening elements may be used to create non-permanent joints, i.e. joints that can be removed or dismantled without damaging the joining objects and/or the fastening elements. A fastening element may be configured to fasten in a manner that does not involve forming a permanent joint as opposed to for example welding or gluing. The fastening element may be or comprise a screw, a flange, a pin, a clamp, a buckle, a clip, a hook, a ring, a snap fastener, a band, a button and/or a bolt.

In the context of the present application, the term "fastening element" may refer to only one part of a fastener, in particular to one of two complementary fastening elements forming a fastener. The fastening element may be a part of a fastener which part is permanently fixed to one of the objects attachable to each other by the fastener. The fastening element may be permanently fixed to the functional module. A complementary fastening element may be permanently fixed to a part of the wind turbine to which the functional module is to be fastened. Fastening a fastening element of an object may thus refer to fastening the fastening element with a complementary fastening element of a further object, to which the object is to be attached. Similarly, unfastening a fastening element may refer to unfastening the fastening element from the complementary fastening element.

The above-described functional module may be advantageous, because such a functional module may be particularly simple and efficient to remove from a wind turbine, for example for maintenance and repair work on the functional module. Removing the functional module may also enable better access to other parts of the wind turbine, e.g. make room for maintenance and repair work on these other parts.

Modularity, i.e. the assembly of systems using individually distinct functional units or functional modules, may allow for efficient design, testing, assemblage, maintenance, upgrade and repair of such systems. Modular components may be easily exchangeable without affecting other parts of the system. Modularity may require that each functional unit or module is arranged in a compact way, being easily separable from other functional units or modules. Modularity may further require that interfaces connecting the functional module with other parts of a system may be easily detachable and attachable so that the proper functioning and interaction of the module within the system is ensured.

Not all functional systems of a wind turbine have conventionally been designed and implemented in a modular way. For example, cooling systems have conventionally been designed and implemented in a non-modular fashion with parts of the cooling system distributed at various locations of the wind turbine and parts of the cooling system permanently fixed to various components of the wind turbine. Such non-modular cooling systems may be difficult and costly to maintain and repair in comparison with a modular cooling system. However, since cooling systems are generally configured to cool a number of components at different locations, they are conventionally designed as distributed non-modular systems. Therefore, considerable technical ingenuity is required to design and implement a cooling system in a modular manner.

Forming the functional module with a fastening element may further support the modular characteristics of the functional module. With such fastening elements the functional module may be easily removable and/or easily exchangeable. The use of detachable fastening elements as opposed to permanent attachment of the functional module may allow for removal of the functional module without damaging the functional module and/or the fastening elements. It may enable repeated removal and/or repeated exchange of the functional module.

Providing the functional module with a cover that forms part of the functional module may allow for protection of the functional module from external influences. The cover may also provide mechanical support for the functional module and may enable a compact arrangement of the functional module on the cover further supporting the modular characteristics of the functional module.

That the cover forms part of a housing of the wind turbine may allow for a particularly simple and efficient design of the housing of a wind turbine. In particular, it may allow for a modular design of the housing in which different parts of the housing are realized by one or more functional modules of the wind turbine. Thus, it may not be necessary to assemble and/or remove the housing separately from the functional modules. Instead, the housing may be at least partially assembled by assembling the functional module. Similarly, the removal of the functional module may include a removal of part of the housing. This may further simplify the removal and exchange of the functional module from the wind turbine.

According to a further embodiment of the present invention, a surface of the cover is configured to form part of an outer surface of the housing, when the functional module is in the predetermined position. The outer surface of the housing may be any surface of the housing that is exposed to an environment of the wind turbine, in particular to an environment of the nacelle.

Such an embodiment may be advantageous, because part of the functional module, in particular the cover, is arranged at an edge or a side of the housing, rather than in the interior of the housing. This may facilitate the removal of the functional module. Also, the functional module may support aerodynamic properties of the wind turbine, because part of the functional module is exposed to an environment.

According to a further embodiment of the present invention, the cover is configured to cover an opening in the housing, when the functional module is in the predetermined position. The functional module is removable from the wind turbine through the opening.

Such an embodiment may be advantageous since a separate opening in the housing for removing the functional module need not be provided. Instead, the opening in the housing resulting from the removal of the cover of the functional module can at the same time be used for removing the functional module through the opening. A separate cover for the opening, such as a door, lid or hatch, may not be needed but the cover of the functional module can be used for covering the opening.

In this embodiment, the removal of the functional module may be significantly simplified, especially compared with a functional module that is arranged completely inside a housing and that does not comprise the above-described cover. For removing a functional module in the latter case, a separate opening in the housing has to be formed with a separate cover to protect the opening. This could for example be an opening in the bottom side of the nacelle with a lid that first has to be opened in order to remove the functional module from the inside of the nacelle. By contrast, according to the above-described embodiment, such a separate opening and a separate cover may not be needed since they are both formed by the functional module.

According to a further embodiment of the present invention, the cover comprises a fluid opening, through which a fluid can be exchanged with an environment of the wind turbine. The fluid may be a cooling fluid such as air, in particular if the functional module is a cooling module. The fluid opening may for example be an air inlet and/or air outlet, for example of a ventilation system. It may be an outlet for exhaust gas generated within the housing, e.g. by the functional module. The fluid opening may be connected to a fluid conduit of the functional module. The fluid opening may be covered by an air grille, e.g. for preventing objects to enter the fluid conduit. The fluid opening of the cover may also be a fluid opening of the housing. Alternatively, the fluid opening of the cover may be arranged adjacent to a fluid opening of the housing, when the functional module is in the predetermined position.

This embodiment may be advantageous because the fluid opening may allow for a direct exchange of the fluid with an environment of the wind turbine. This may for example enable a particularly efficient disposal of waste heat to the environment.

According to a further embodiment of the present invention, the functional module further comprises a conduit for conveying a further fluid and a connection element configured to detachably connect the conduit with a further conduit of the wind turbine. The further fluid may consist of the same material as the fluid or may consist of a different material. The further fluid may be a cooling fluid, in particular a cooling gas or a cooling liquid. The further fluid may be air or water. The fluid may be different from the further fluid, for example in the case of indirect cooling. It may be the same, for example in the case of direct cooling. The conduit may be connected to the fluid opening.

When the conduit is connected to the further conduit by the connection element, the further fluid may flow between the conduit and the further conduit. It may flow from the functional module through the further conduit to other parts of the wind turbine, in particular heat generating parts, and/or may flow in the opposite direction. The connection element may be configured to securely and tightly fasten the conduit to the further conduit. The connection element may be a quick-release connection element configured for a particularly quick and easy release and coupling of the conduit to the further conduit. The connection element may be threadable and/or pluggable. It may comprise a securing mechanism, which if activated secures the connection between conduit and further conduit.

Such an embodiment may be advantageous because an interface between the functional module, in particular the conduit of the functional module, and other parts of the wind turbine, in particular the further conduit, may be provided by the connection element. Such an interface may enable the exchange of matter and/or energy between the functional module and other parts of the wind turbine. Such an interface, in particular if it is easy to connect and disconnect, supports the modularity of the functional module. It may support a simple and efficient removal of the functional module from the wind turbine.

According to a further embodiment of the present invention, the fastening element is configured to fasten the functional module to a support structure of the wind turbine.

A "support structure" may be a structure providing stiffness and strength for the wind turbine, in particular for the nacelle. It may enable the wind turbine, in particular the nacelle, to resist impacting forces, for example internal forces due to structural loads and/or external forces, e.g. due to wind impacting on the wind turbine. The support structure may provide support due to the stiffness and/or strength of a material of the support structure and/or due to a specific geometry of the support structure. The support structure may comprise at least one of a beam, a column, a cable, a frame, an arch, and a surface element such as a wall, a slab, and/or a shell. The support structure may be a rear-end support structure (RESS) providing support for a rear end of the wind turbine, which rear end comprises at least part of the nacelle, the rear end being opposite a front end comprising the rotor of the wind turbine.

The functional module may be configured to be fastened only to the support structure. It may be configured not to be fastened to the housing. When fastened to the wind turbine by the fastening element, there may be no structural connections between the functional module and the housing.

Such an embodiment may be advantageous as it may allow for an especially stable and secure attachment of the functional module to the wind turbine. It may further be advantageous because the housing may be at least partially decoupled from the functional module with respect to vibrations and/or structural loads.

According to a further embodiment of the present invention, the fastening element is configured to fasten the functional module to a support beam of the support structure, in particular by means of a hanging connection and/or a standing connection.

A "hanging connection" may be a connection, in which the functional module is hung from the support structure of the wind turbine. A hanging connection may be defined as a connection, in which the functional module is connected with the wind turbine from above, in particular only from above. In a hanging connection, no connection points may be on the bottom of the functional module. In a hanging connection, connection points may be absent on the cover of the functional module. The functional module may be configured to be fastened only to one or more support beams of the support structure, which support beams may be arranged above the functional module. A "standing connection" may be a connection, in which the functional module is attached, e.g. by means of bolts, to the support structure from below and/or from a side, i.e. the functional module lies on the support structure.

Such an embodiment may be advantageous as it may allow for an especially stable and secure attachment of the functional module to the wind turbine. A hanging connection may allow for a particularly simple removal of the functional module through an opening at the bottom of the housing. The embodiment may further be advantageous because the housing may be at least partially decoupled from the functional module in terms of vibrations and/or structural loads.

According to a further embodiment of the present invention, the opening of the housing, through which the functional module is removable, is arranged at least partly, in particular completely, at the bottom of the housing. Such an embodiment may be advantageous for an especially simple removal of the functional module.

According to a further embodiment of the present invention, the functional module is a cooling module configured to cool a component of the wind turbine, in particular a component with moving parts and/or a heat generating component. The functional module may be configured to cool at least one of a pitch system bearing, a generator, a lubricant, an electrical component, a converter, a transformer, and an electrical cabinet.

Such an embodiment may be advantageous because cooling modules are typically conceived as non-modular distributed systems. Thus, particular technical ingenuity may be required to provide a cooling system as a functional module.

According to a further embodiment of the present invention, the functional module is a transformer module. The cover of the transformer module may be configured to form part of a bottom side of the housing. The cover may be attached to the transformer module and may be removable from the housing upon removal of the transformer module.

According to a further embodiment of the present invention, the functional module further comprises at least one of: a liquid cooling system, a circulation pump, an active corrosion protection, an air in-take, an air out-take, a fan, and a heat exchanger.

According to a further embodiment of the present invention, the functional module comprises two cooling units, which are detachable from each other and which are operable independently of each other. Each cooling unit may be removable and/or exchangeable from the wind turbine independently.

This embodiment may be advantageous as it may implement redundancy for the cooling system of the wind turbine. In particular, already one cooling unit may be sufficient to ensure at least some basic cooling of the wind turbine. Thus, operation of the wind turbine may continue even if one of the cooling units is removed, e.g. for maintenance or repair. This embodiment may also further support the modular characteristics of the functional module as it implements an additional modularity with respect to parts of the functional module. In other words, the functional module may itself be built in a modular manner.

According to a further embodiment of the present invention, a wind turbine comprises the above-described functional module.

According to a further embodiment of the present invention, a gap at least partially separates the cover from the housing, when the functional module is in the predetermined position. Such a gap may allow for a particularly efficient decoupling of the housing from the functional module, in particular with respect to vibrations and/or structural loads.

According to a further embodiment of the present invention, a damping structure, in particular a rubber band or rubber layer, is arranged in the gap. The damping structure may be arranged in a way that it at least partially covers the gap, in particular fully covers the gap. The damping structure may be configured to seal the gap between housing and functional module. Such a damping structure may allow for a particularly efficient decoupling of the housing from the functional module, in particular with respect to vibrations and/or structural loads.

According to a further embodiment of the present invention, the wind turbine further comprises a lifting device to which the functional module is attachable and which is configured for lowering and raising the functional module, wherein in particular the lifting device is mounted to the wind turbine. The lifting device may be mounted in the housing, in particular in the nacelle, or on the housing, in particular on the nacelle. It may also be an external lifting device, which is separate from the wind turbine. The lifting device may be or comprise at least one of a crane, a winch, a wire system, and a hoisting wire. The hoisting wire may be attachable to the functional module by means of one or more attachment elements of the functional module, e.g. a ring.

Such an embodiment may be advantageous, since a lifting device may further simplify the removal and exchange of a functional module. This may hold in particular, if the lifting device is mounted to the wind turbine.

Before, referring to the drawings, exemplary embodiments will be described in further detail, some basic considerations will be summarized based on which exemplary embodiments of the present invention have been developed.

In case of upgrade or huge servicing task of a functional module such as a cooling unit or cooling system of a wind turbine, in particular an offshore wind turbine, it will be beneficial to make an exchange of the entire system with an upgraded or serviced unit for lowering the down time of the wind turbine.

This may be achieved by making a complete structurally decoupled functional module such as a cooling unit, which can be easily untightened and lowered with a lifting device such as a crane or an internal hoist mechanism, e.g. a winch or crane and wire system, and lifted down/up to/from ground, a platform or a vessel. It may further be achieved by supporting the cooling unit by hanging in a support structure such as a rear-end support structure, without (permanent) structural connections to a housing such as the canopy of the wind turbine. And it may be achieved by making a clear and flexible split line, in terms of structure, between canopy and cooling unit for easy exchange of the cooling unit.

An advantage may lie in the modularization of a cooling unit as this opens up possibilities for exchange of such cooling unit for service and repair tasks. If a complete unit fails or needs maintenance for a longer period, it can be exchanged with a new unit fast, and thus allow the turbine to be operating without significant standstill periods. Due to the de-coupling, the cooling unit can be mounted and even pre-tested, before the canopy is covering the turbine in production line.

By de-coupling the cooling unit from the canopy, vibrations and loads from the canopy are not transferred into the cooling unit. Such vibrations and loads can influence, negatively, the performance and durability of the individual parts comprised in the cooling unit. By hanging the cooling unit directly in the rear end support structure, load paths from cooling unit to tower are clear and understandable, i.e. well determined.

An advantage may lie in optimized production and service, i.e. a complete unit can be assembled, tested and installed independently of the other components needed for a full nacelle. This optimizes the assembly time needed for production of the complete nacelle.

The cooling unit may comprise: a liquid cooling system including circulation pumps, direct cooling with active corrosion protection (e.g. mist eliminator, preheater and salt filters), air in- and out-take, fans, heat exchangers and the like. Each part individually, as above, may comprise just a single unit or be divided into several sub-units which can run separately for curtailment (redundancy) or for optimal performance regarding cooling of the turbine. For example, by having four (small) fans for air exhaust rather than one fan (big), the turbine can still continue operation, possibly at a lower level, after one or more fans fails. The same can be applicable to a liquid cooling system with more than one pump for circulation of the coolant to the parts in need of cooling.

Components within a turbine, i.e. components placed in or on the nacelle, tower or tower foundation, that may require cooling include moving parts such as pitch system bearings, generator and the like as well as heat generating devices such as lubricants used in moving parts and electrical components including converter(s), transformer and electrical cabinets.

In addition, by having two complete cooling systems within one cooling unit that can act independent of one and another, if one cooling system fails completely or partly fails, the other system can depending on failure mode and/or ambient temperature take over partly (support) or completely, and still provide sufficient cooling to the components in need of cooling. This ensures the turbine can continue operation, possibly slightly de-rated, but nonetheless avoids a complete shut-down of the turbine.

Those components within the nacelle in need of cooling are connected to the cooling unit by hoses, pipes or the like for the transfer/supply of the cooling media (air or liquid). The connection points of such transfer means are made such that they can easily be disconnected and connected to the cooling unit to make the exchange/installation of the cooling unit easy and fast.

The aspects defined above and further aspects of the present invention are apparent from the examples of embodiment to be described hereinafter and are explained with reference to the examples of embodiment.

BRIEF DESCRIPTION

Some of the embodiments will be described in detail, with reference to the following figures, wherein like designations denote like members, wherein.

DETAILED DESCRIPTION

Figure 1:
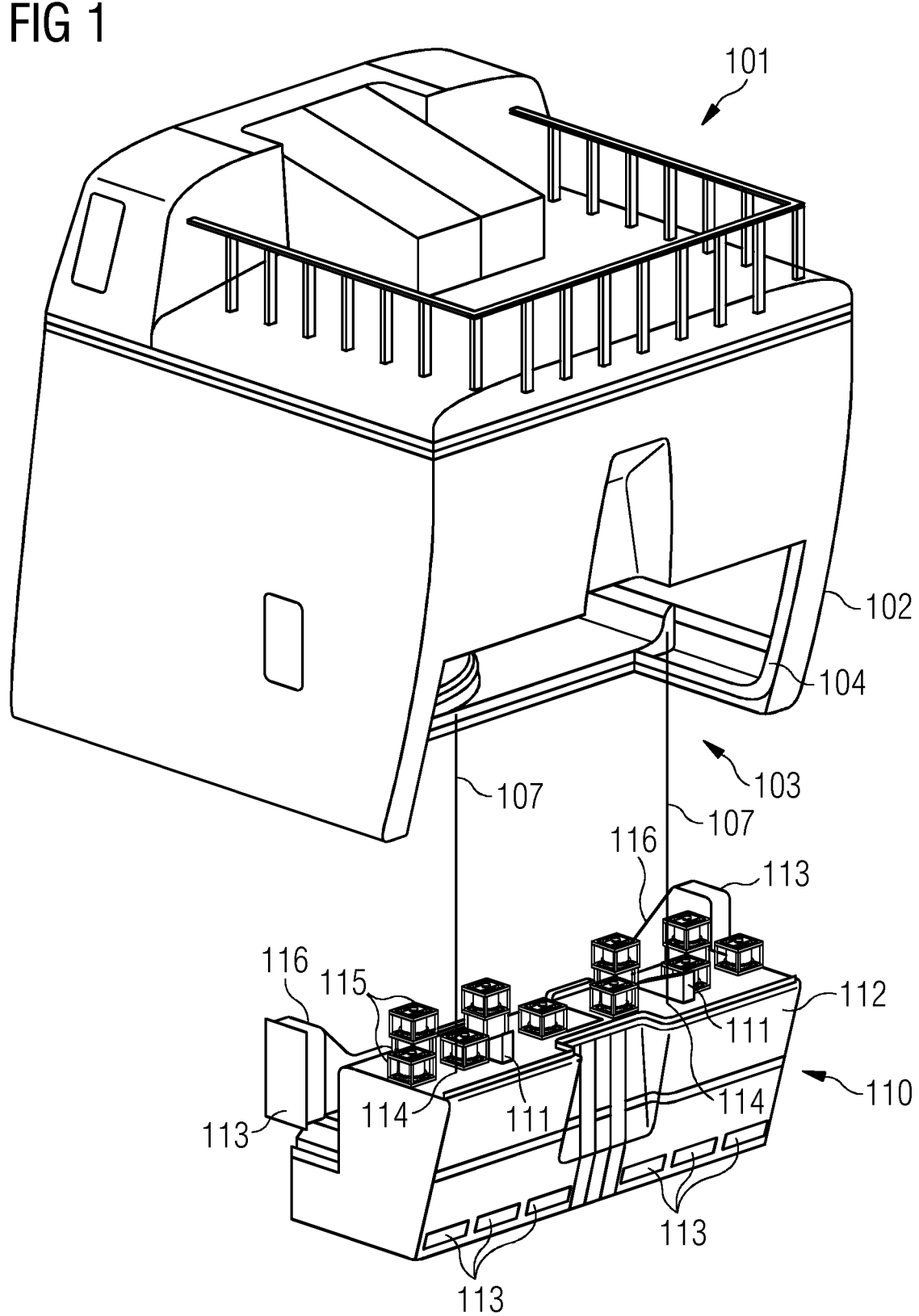
FIG. 1 depicts a perspective view of an exemplary embodiment of a functional module hanging from a nacelle of a wind turbine.

The illustrations in the drawings are schematic. In different drawings, similar or identical elements are provided with the same reference signs. For the sake of clarity and comprehensibility, reference signs are sometimes omitted for those features, for which reference signs have already been provided in earlier figures.

FIG. 1 shows a perspective view of a functional module 110 hanging from a nacelle 101 of a wind turbine according to an exemplary embodiment of the present invention. The functional module 110 comprises a fastening element 111 configured to detachably fasten the functional module 110 to the wind turbine in a predetermined position, wherein the functional module 110 is removable from the predetermined position, when the fastening element 111 is unfastened. The functional module 110 further comprises a cover 112 configured to form part of a housing 102 of the wind turbine, when the functional module 110 is in the predetermined position. The functional module 110 is configured to carry out a function contributing to the operation of the wind turbine, when the functional module 110 is in the predetermined position.

The nacelle 101 comprises a housing 102, for example a canopy, with an opening 103. The opening 103 is arranged in a bottom rear part of the nacelle 101 and extends over a bottom side and a back side of the nacelle 101. Along an outer edge of the opening 103, a damping structure 104 is arranged, for example a rubber layer or rubber band. The damping structure 104 is in contact with the functional module 110 and connects the functional module 110 with the housing 102, when the functional module 110 is arranged in the opening 103.

The functional module 110 comprises fastening elements 114 for fastening the functional module 110 to the nacelle 101, when the functional module 110 is arranged in the opening 103. A cover 112 of the functional module 110 forms part of the housing 102 of the nacelle 101, when the functional module 110 is arranged in the opening 103. The cover 112 comprises fluid openings 113 for exchanging air with an environment of the wind turbine. Some of the fluid openings 113 are arranged on the lower back side of the functional module 110. Other fluid openings 113 are arranged to the side of the functional module 110. These other fluid openings 113 are positioned adjacent to corresponding fluid openings in the housing 102, when the functional module 110 is arranged in the opening 103. The fluid openings 113 are covered with grilles. Some of the fluid openings 113 are connected to fluid conduits 116 for transporting the fluid to or from other parts of the functional module 110 or of the wind turbine. Some of the fluid openings 113 may be coupled with direct cooling fans 115 arranged on the functional module 110. These cooling fans 115 may be used for ventilation of an interior of the nacelle 101.

The functional module 110 hangs from the nacelle 101 by means of two hoisting wires 107. The hoisting wires 107 are attached to a lifting device (not shown) in the nacelle 101 comprising a hoisting mechanism. The hoisting wires 107 are attached to the functional module 110 by means of attaching elements 114. The lifting device may raise the functional module 110 from the shown position to a position, where the functional module 110 is arranged in the opening 103. This latter position is the predetermined position, in which the functional module 110 can be fastened to the nacelle 101 using the fastening elements 111 and in which the functional module 110 is configured to carry out its intended function.

Figure 2:
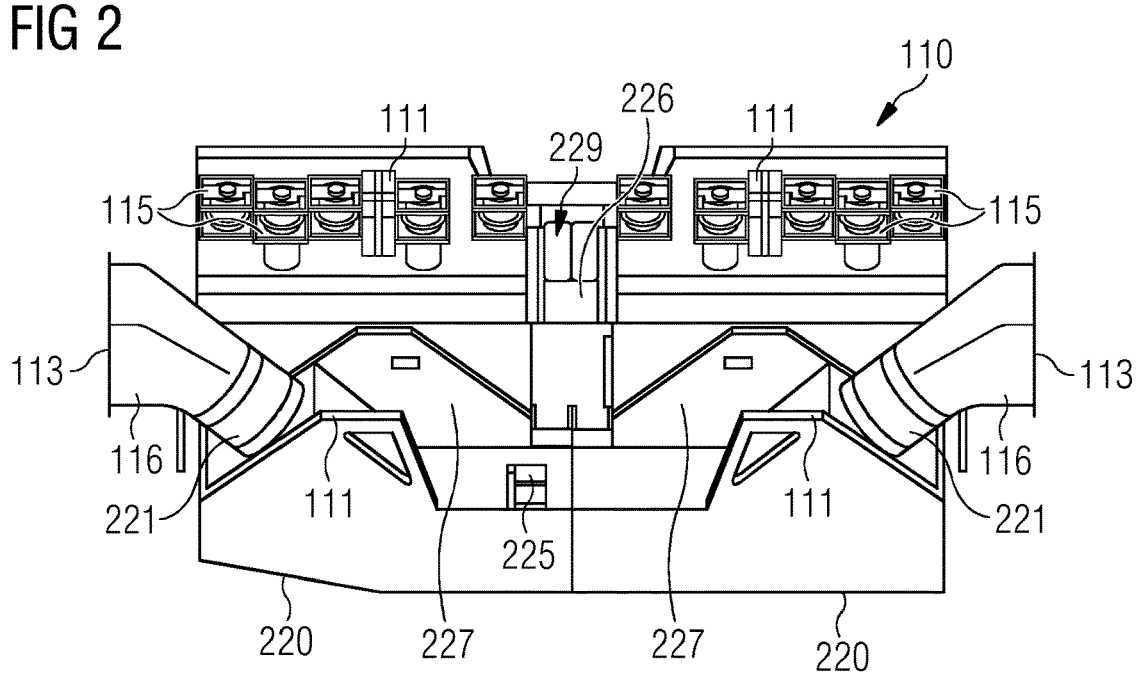
FIG. 2 depicts a perspective view of the functional module shown in FIG. 1.

FIG. 2 shows a perspective view of the functional module 110 shown in FIG. 1. The functional module 110 comprises two similar cooling units 220, which are built mirror-symmetrically to each other and which are arranged adjacent to each other. Each of the cooling units 220 comprises a fluid opening 113 towards a side of the functional module 110 at the end of a respective conduit 116. An indirect cooling fan 221 is arranged in each of these conduits 116. Each cooling unit 220 comprises five direct cooling fans 115, which are arranged towards the rear side on top of the cooling units 220. The functional module 110 further comprises a fan motor 227, a pump motor 226, a dehumidifier 225 and an electrical cabinet 229, which are all arranged between the two cooling units 220. Fastening elements 111 of each cooling unit 220 are configured for fastening the functional module 110 to a support structure (not shown). A fastening element 111 of each cooling unit 220 is formed as a triangular frame in the front of the functional module 110. Another fastening element 111 of each cooling unit 220 is arranged towards the rear side on top of the respective cooling unit 220. The fastening elements 111 are configured to be fastened from below to a support beam of the support structure.

Figure 3:
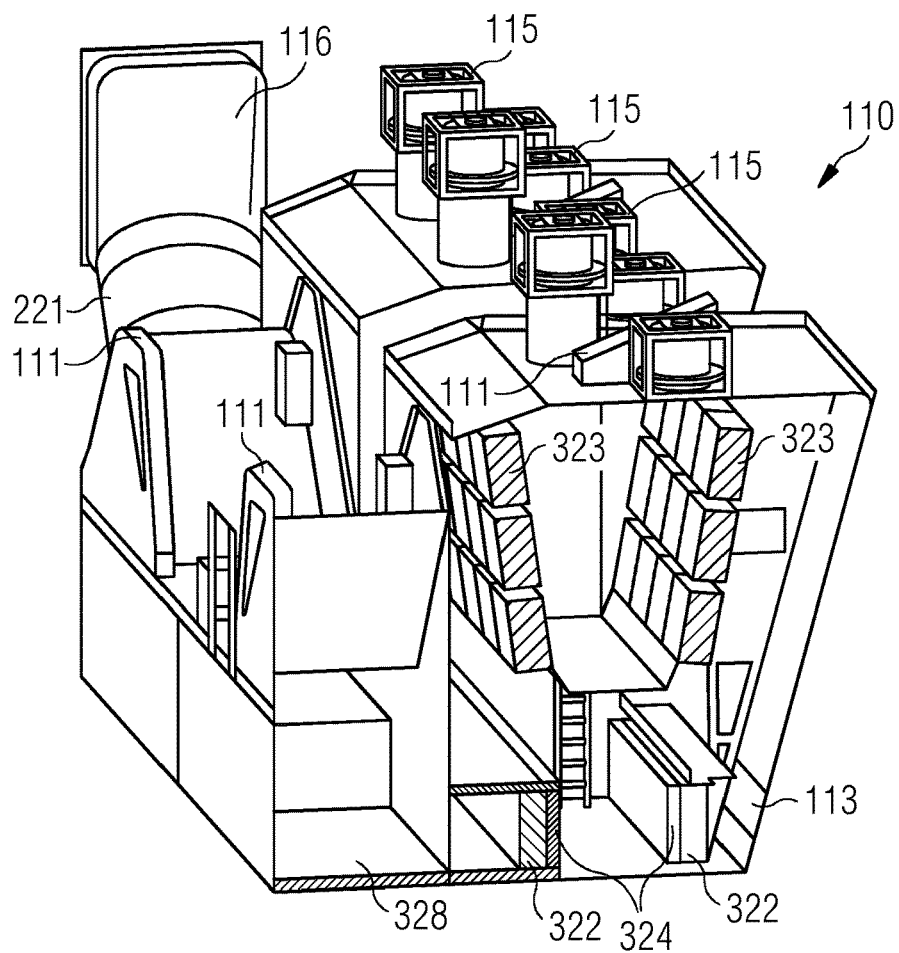
FIG. 3 depicts a cross-sectional view of the functional module shown in FIG. 1.

FIG. 3 shows a cross-sectional view of the functional module 110 shown in FIGS. 1 and 2. It shows a cross-section through one of the cooling units 220 with the other cooling unit 220 having a similar design. In the interior of the cooling unit 220, preheaters 324, mist eliminators 322 and filters 323 are arranged, which support the direct cooling enabled by the direct cooling fans 115. A converter cooler or transformer cooler 328 relies on indirect cooling enabled by the indirect cooling fans 221.

Figure 4:
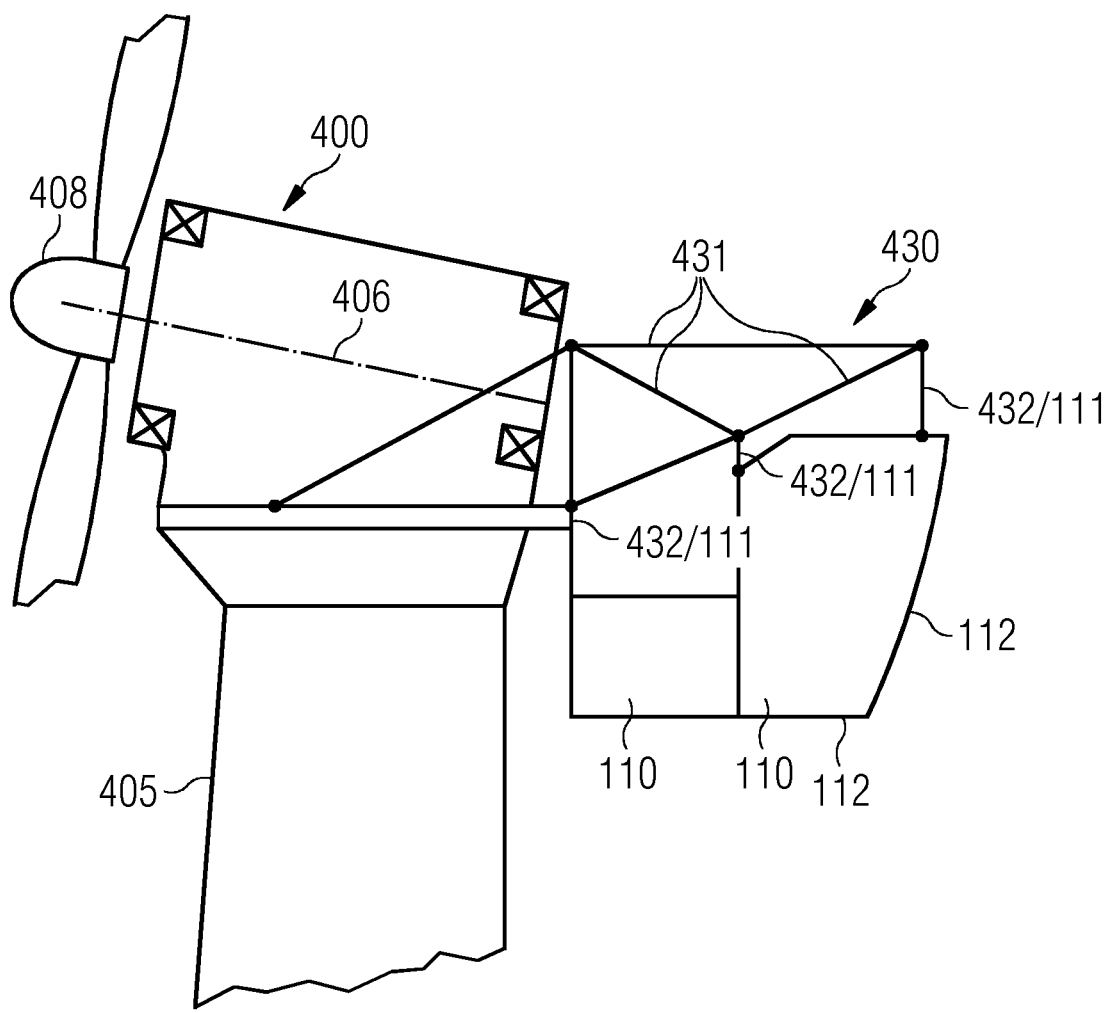
FIG. 4 depicts a schematic side view of a wind turbine including an exemplary embodiment of a functional module. The functional module is attached to a support structure of the wind turbine.

FIG. 4 shows a schematic side view of a wind turbine 400 comprising a functional module 110 according to an exemplary embodiment of the present invention. The functional module 110 is attached to a support structure 430 of the wind turbine 400. The support structure 430 is a rear-end support structure 430 arranged opposite to a rotor 408 of the wind turbine 400. Compared with the rotor 408, the support structure 430 is arranged at the opposite side of a tower 405 and a drive train 406 on top of the tower 405. Connecting rods or connecting brackets 432 connect the functional module 110 with support beams 431 of the support structure 430. The connecting rods or connecting brackets 432 can be considered to form part of fastening elements 111 of the functional module 110. With these fastening elements 111, the functional module 110 can be connected to the support structure 430 from below. A cover 112 on the bottom side and on the back side of the functional module 110 forms part of a housing at the rear end of the wind turbine 400.

Figure 5:
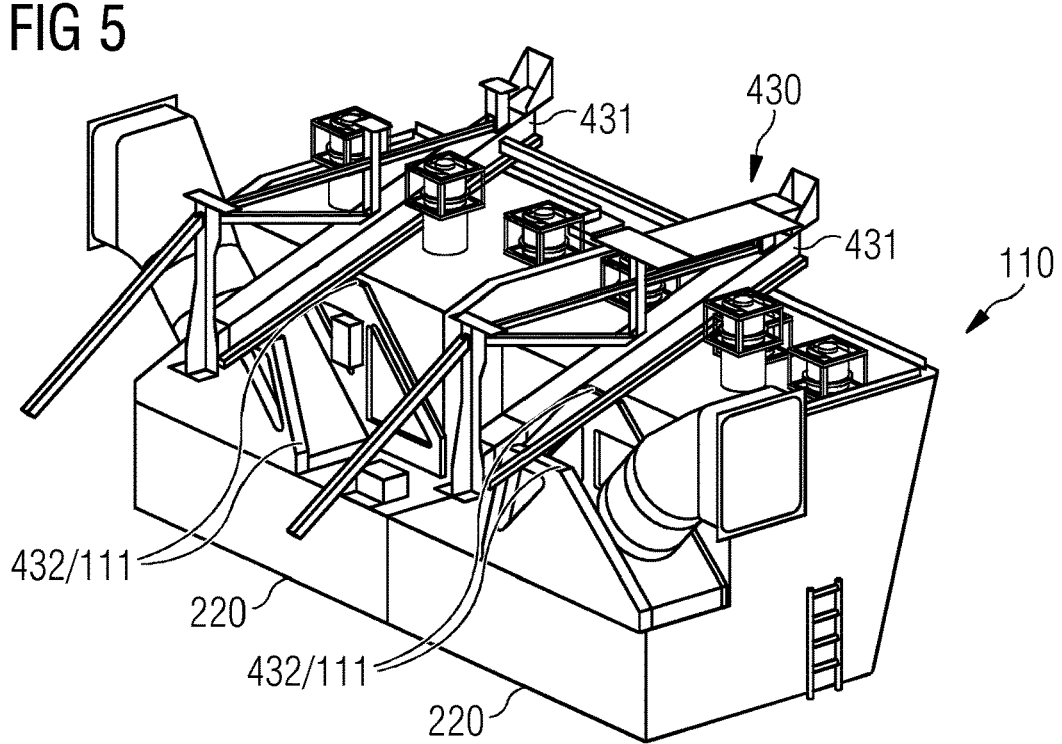
FIG. 5 depicts a perspective view of the functional module of FIG. 1 attached to a support structure.

FIG. 5 shows a perspective view of the functional module 110 of FIGS. 1, 2 and 3 attached to a support structure 430. Only part of the support structure 430 is depicted. Each of the two cooling units 220 comprises two frames in the form of truncated triangles, with each frame being part of a fastening element 111 configured to fasten the functional module 110 to the support structure 430. At the truncated side of the triangle, the frames are attached to a support beam 431 of the support structure 430. The two frames of each cooling unit 220 are attached to the same beam 431, respectively, while each cooling unit 220 is attached to a different beam 431, wherein the beams 431 are arranged parallel to each other. The two frames of each cooling unit 220 are arranged in a front part of the functional module 110. Such triangular frames may allow for distributing load, when the functional module 110 is attached to the support structure 430.

Figure 6:
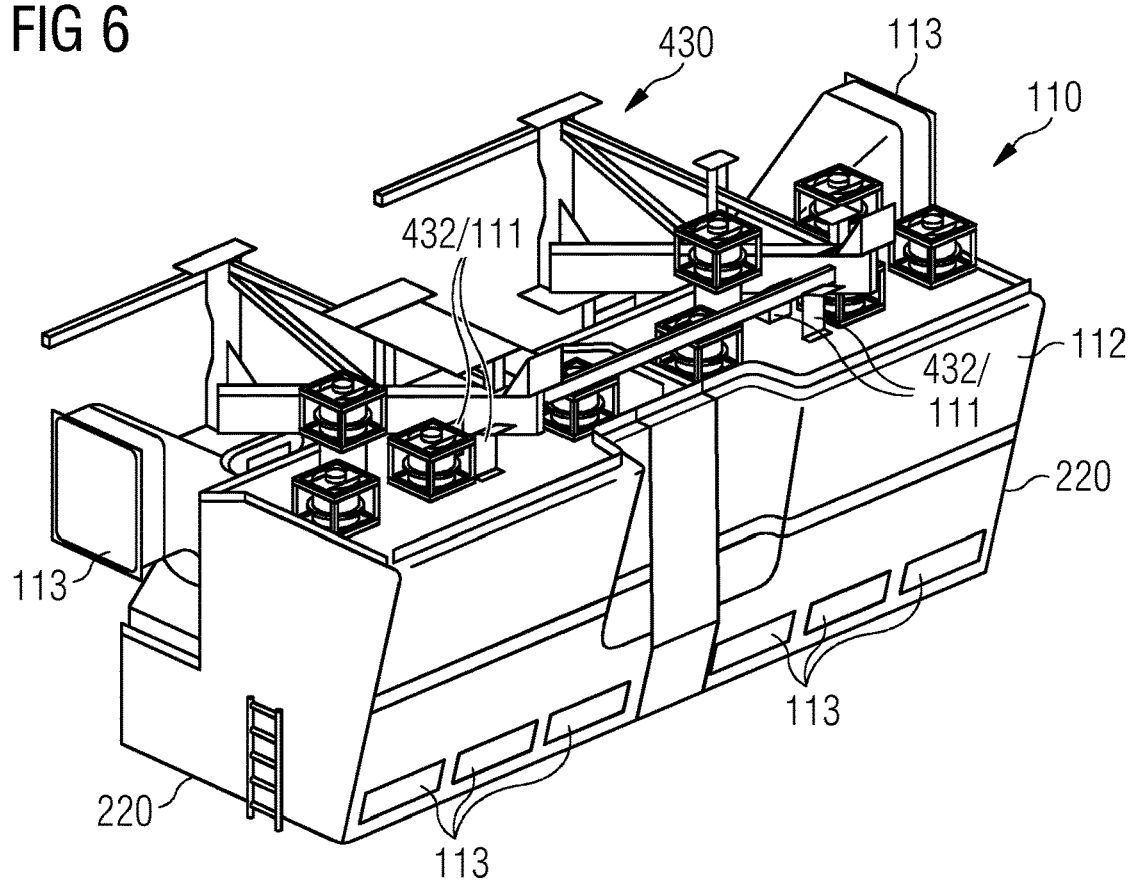
FIG. 6 depicts a perspective view of the functional module of FIG. 1 attached to a support structure.

FIG. 6 shows another perspective view of the functional module 110 attached to the support structure 430 as shown in FIG. 5. Further fastening elements 111 are shown, which are arranged towards the rear side of the functional module 110. The fastening elements 111 each comprise a connecting rod or connecting bracket 432 configured to be attached to support beams 431 of the support structure 430. The support beams 431 lie on contact surfaces of the connecting brackets 432 in direction of the gravitational force, from which contact surfaces they are easily detachable. For each cooling unit 220, these further fastening elements 111 and the fastening elements of FIG. 5 are positioned such that they can be attached to the same support beam 431.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A functional module for a wind turbine, the functional module comprising:
    a fastening element configured to detachably fasten the functional module to the wind turbine in a predetermined position, wherein the functional module is removable from the predetermined position, when the fastening element is unfastened;

a cover configured to form part of a housing of the wind turbine, when the functional module is in the predetermined position;

a fluid conduit configured to transport a fluid to or from parts of the functional module or of the wind turbine; and a fluid opening arranged to a side of the functional module, connected to the fluid conduit and positioned adjacent to a corresponding fluid opening in the housing, when the functional module is in the predetermined position wherein the functional module is configured to carry out a function contributing to an operation of the wind turbine, when the functional module is in the predetermined position;

wherein the cover is configured to cover an opening in the housing, when the functional module is in the predetermined position.

2. The functional module according to claim 1, wherein a surface of the cover is configured to form part of an outer surface of the housing, when the functional module is in the predetermined position.

3. The functional module according to claim 1:
wherein the functional module is removable from the wind turbine through the opening.

4. The functional module according to claim 1, wherein the cover comprises a further fluid opening, through which a fluid can be exchanged with an environment of the wind turbine.

5. The functional module according to claim 1, further comprising:
a further conduit configured for conveying a further fluid; and
a connection element configured to detachably connect the conduit with a further conduit of the wind turbine.

6. The functional module according to claim 1, wherein the fastening element is configured to fasten the functional module to a support structure of the wind turbine.

7. The functional module according to claim 6, wherein the fastening element is configured to fasten the functional module to a support beam of the support structure.

8. The functional module according to claim 1, wherein the functional module is a cooling module configured to cool a component of the wind turbine that has moving parts and/or a heat generating component.

9. The functional module according to claim 1, further comprising at least one of: a liquid cooling system, a circulation pump, an active corrosion protection, an air in-take, an air out-take, a fan, and a heat exchanger.

10. The functional module according to claim 1, wherein the functional module comprises two cooling units, which are detachable from each other and which are operable independently of each other.

11. A wind turbine comprising the functional module of according to claim 1.

12. The wind turbine according to claim 11, wherein a gap at least partially separates the cover from the housing when the functional module is in the predetermined position.

13. The wind turbine according to claim 12, wherein a damping structure is arranged in the gap.

14. The wind turbine according to claim 11 further comprising:
a lifting device to which the functional module is attachable and which is configured for lowering and raising the functional module, wherein the lifting device is mounted to the wind turbine.

15. A method of coupling a functional module to a wind turbine, the method comprising:
detachably fastening the functional module to the wind turbine in a predetermined position by means of a fastening element, wherein the functional module is removable from the predetermined position, when the fastening element is unfastened;
wherein the wind turbine comprises a cover configured to form part of a housing of the wind turbine, when the functional module is in the predetermined position;
wherein the functional module is configured to carry out a function contributing to the operation of the wind turbine, when the functional module is in the predetermined position;
wherein the cover is configured to cover an opening in the housing, when the functional module is in the predetermined position;
wherein the functional module comprises a fluid conduit configured to transport a fluid to or from parts of the functional module or of the wind turbine, and a fluid opening arranged to a side of the functional module and connected to the fluid conduit;
wherein the fluid opening is positioned adjacent to a corresponding fluid opening in the housing, when the functional module is arranged in the predetermined position.

* * * * *